US008390625B2

(12) United States Patent
Zuniga (10) Patent No.: US 8,390,625 B2
(45) Date of Patent: Mar. 5, 2013

(54) TRANFORMING STORED DATA INTO DATA OF REQUESTED DETAIL LEVEL (75) Inventor: Fabiel Zuniga, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 12/608,830

(22) Filed: Oct. 29, 2009

(65) Prior Publication Data

US 2011/0102439 A1 May 5, 2011

(51) Int. Cl.
*G06T 11/20* (2006.01)
(52) U.S. Cl. ........................................ 345/441
(58) Field of Classification Search .......... 345/428, 345/441
See application file for complete search history.

(56) References Cited

U.S. PATENT DOCUMENTS

| 5,684,508 | A  | * | 11/1997 | Brilman ........... | 345/440.1 |
| 7,133,911 | B1 | * | 11/2006 | Schaffer et al. ...... | 709/224 |
| 2007/0016666 | A1 | * | 1/2007 | Duffield et al. ...... | 709/223 |
| 2007/0112955 | A1 | * | 5/2007 | Clemm et al. ........ | 709/224 |
| 2009/0089226 | A1 | * | 4/2009 | Bradford et al. ..... | 706/12 |
| 2009/0144304 | A1 | * | 6/2009 | Stephens et al. ..... | 707/101 |
| 2009/0161570 | A1 | * | 6/2009 | Duffield et al. ...... | 370/252 |

OTHER PUBLICATIONS

Seong Soo Kim and A. L. Narasimha Reddy; "A Study of Analyzing Network traffic as Images in Real-Time"; INFOCOM 2005. 24th Annual Joint Conference of the IEEE Computer and Communications Societies, Mar. 17, 2005; Proceedings IEEE, vol. 3 pp. 2056-2067.*

* cited by examiner

*Primary Examiner* — Edward Martello (57) ABSTRACT

A system includes a processor and a memory coupled to the processor. The processor receives a request to send a first data for a graphical representation in a first level of detail over a first time. The processor transforms a first stored data into the first data in the first level of detail. The first stored data is stored in a second level of detail over a second time and a third level of detail over a third time. The second level of detail is not identical to the third level of detail, and the second time is not identical to the third time. The first stored data is stored in the memory. The processor sends the first data in the first level of detail.

20 Claims, 4 Drawing Sheets

TRANFORMING STORED DATA INTO DATA OF REQUESTED DETAIL LEVEL

BACKGROUND

Monitoring data is an important activity in any field. Collecting data over time and analyzing it later in a graphical way such as a chart or report enables quality assurance, an ability to adapt to trends, and forecasting. Charts allow a user to visualize information behavior over time, and make understanding large quantities of data and the relationship between different parts of the data easier. Reports allow the user to analyze detailed information about specific time frames. Collected data can become very large quickly, making it difficult to store. In these cases, the data may be summarized before it is stored. However, level of detail inconsistencies in stored data, even of the same variable, make presenting the data in a meaningful manner difficult.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

Figure 1A:
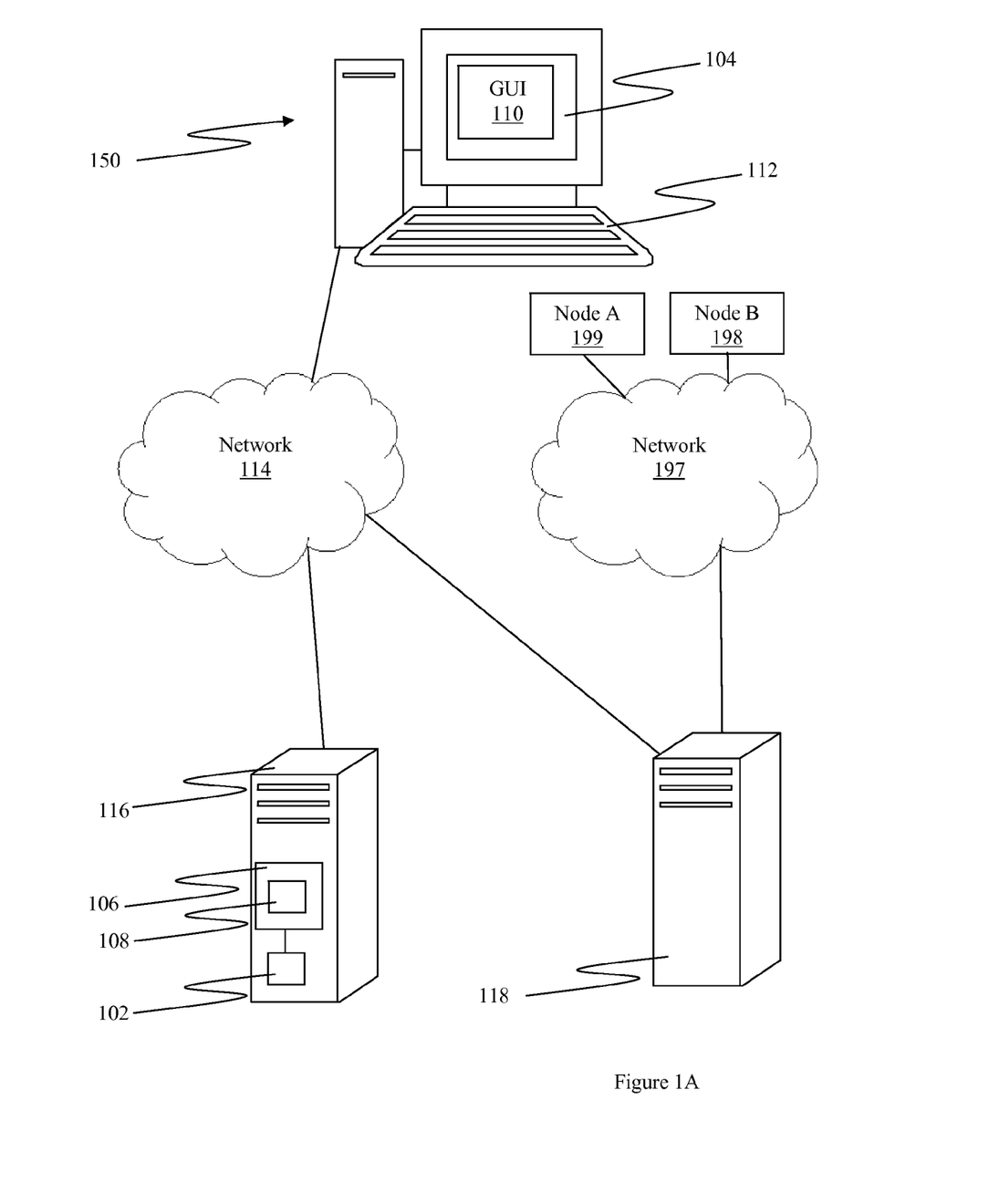
FIG. 1A illustrates two networks used for collecting data and processing data in accordance with at least some illustrative embodiments.

This disclosure describes methods, networks, machine-readable storage mediums, apparatuses, and systems to present stored data independently of the level of detail of storage. FIG. 1A illustrates two networks 197, 114. For example purposes only, consider a computer network 197 including two nodes: node A 199 and node B 198. One variable that is commonly collected is throughput between nodes. One way to collect measurements of the throughput between nodes A and B is to test the throughput every second and store the result. The throughput is tested via an agent 118. An agent is a collector of data. As illustrated, the agent 118 is a server because a server is an efficient mechanism to collect throughput data. The agent 118 may be a sensor if illumination data should be collected, or the agent may even be a person if a person is necessary for the type of data collected. Any type of data can be collected.

If network 197 is anticipated to last two years, a level of detail of one sample per second would yield a database of 63,113,852 entries, which may be too many entries for some systems to reasonably store and manipulate over the two years. As such, the level of detail of the data is too fine. Level of detail is the granularity of the data. One method to coarsen the level of detail is to decrease the sample size by decreasing the rate of collection, i.e., the collection level of detail. For example, if the collection level of detail is adjusted to one sample per two seconds, the database would halve in size. Another method to coarsen the level of detail is to summarize the stored data, i.e., adjust the storage level of detail. For example, if the collection level of detail remains at one sample per second, but the throughput data is summarized each week, the database would include 104 entries over two years: one entry for each week. In at least some embodiments, the agent 118 performs the summary and a server 116 stores the summarized data.

A mathematical discussion of summarization will be helpful. Please consider the following assumptions.

Let data be collected with a frequency of $\rho$. For example, every $\rho$ milliseconds new throughput (in our example) data is collected.

Let $\lambda$ be the summarization frequency, where $\lambda \geq \rho$. In other words, every $\lambda$ milliseconds a summarization is performed.

Let t be the time that the summarization takes place.

Let $E=\{e_1, \ldots, e_n\}$ be the set of monitored entities, e.g., the different locations that throughput is measured.

Let $m_i$ be the number of observations, where every data collection generates one observation.

Let $s_j$ be the collected data. Each $s_j$ has a timestamp $\tau$, where $\tau_{ij}$ represents the timestamp of the observation j to the entity i ($\tau_{ij} < \tau_{ij+1}$).

Let $H=\{h_1, \ldots, h_n\}$ be the entities' history for $[t-\lambda, t)$ where $h_i = <s_1, \ldots, s_{mi}>$ is the history for an entity $e_i$.

During summarization, n entries (one for each entity) will be generated where the entry for the entity $e_i$ is generated as:

$t_{init}=t-\lambda$ is the start of the history window;

$t_{end}=t$ is the end of the history window;

$t_{unknown}=\lambda-(m_i \cdot \rho)$ is time for which there is no collected data.

Summarization is calculated differently depending on the type of variable to be summarized. A CounterField variable represents any accumulative numeric data. Some examples of accumulative numeric data are number of errors, number of transmitted packets, etc. However, any variable is possible. An AverageField variable represents any numeric data for which an average should be stored. An example for which an average should be stored is throughput. However, any variable is possible. A MaxField or MinField variable represents numeric data for which the maximum value or minimum value should be stored, respectively. An example is signal power. However, any variable is possible. Summarization for the different types of variables is calculated using the below equations.

$$SCounterField = \sum_{j=1}^{m_i} s_{ij} \to CounterField$$

$$SAverageField = \sum_{j=1}^{m_i} s_{ij} \to AverageField$$

$$SMaxField = \text{Max}\{s \to MaxField \mid s \in h_i\}$$

$$SMinField = \text{Min}\{s \to MinField \mid s \in h_i\}$$

If the frequency of data collection changes, summarization can still be performed. Please consider the following assumptions.

Let $\rho'$ be a previous value of $\rho$.

Let t be the current time and t' the last time a summarization was performed.

Let a partial summarization be performed using $\rho$ and $\lambda = t-t'$

Let t be changed to be the time where the next summarization is performed.

Let a summarization integration be performed creating n entries (one for each entity) where the entry for the entity $e_i$ is generated by:

Letting $R_{ei}$ be the summarized entity entry for $e_i$ where $R_{ei}$[History window start]=$t-\lambda$.

if $R_{ei}$ does not exist, then

The entry for the device $e_i$ is generated as described when the frequency of data collection does not change.

if $R_{ei}$ exists,

Let $R_{ei}[t_{end}]=t$.

Let $R_{ei}[t_{unknown}]=R[t_{unknown}]+((t-R_{ei}[t_{end}])-(m_i \cdot \rho))$.

Let Observations=R[Observations]+$m_i$.

With these new assumptions, summarization for the different types of variables is calculated using the four equations below.

$$SCounterField = R_{e_i}[SCounterField] + \sum_{j=1}^{m_i} s_{ij} \to CounterField$$

$$SAverageField = R_{e_i}[SAverageField] + \sum_{j=1}^{m_i} s_{ij} \to AverageField$$

$$SMaxField = \text{Max}\{R_{e_i}[SMaxField], \text{Max}\{s \to MaxField \mid s \in h_i\}\}$$

$$SMinField = \text{Min}\{R_{e_i}[SMinField], \text{Min}\{s \to MinField \mid s \in h_i\}\}$$

If summarization frequency changes, summarization can still be performed. Please consider the following assumptions.

Let $\lambda'$ be the new value for $\lambda$.

If $\lambda' \geq \lambda$

The data at the change will be summarized in the next cycle.

If $\lambda' < \lambda$, let t be the current time and t' be the last time a summarization was performed. If $t-t' \geq \lambda$, then $(t-t')/\lambda$ summarizations are performed. The remainder, $(t-t') \% \lambda$, will be summarized in the next cycle. With these new assumptions, summarization for the different types of variables is calculated using the same four equations.

Figure 1B:
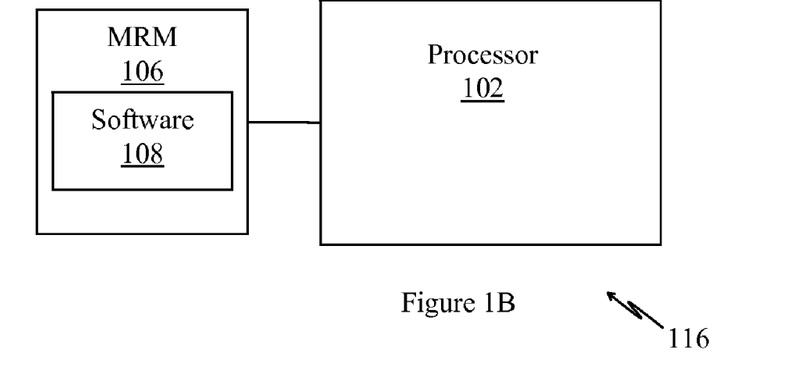
FIG. 1B illustrates a system and machine-readable storage medium used in accordance with at least some illustrative embodiments.

FIG. 1B illustrates server 116 in detail. In at least some embodiments, the server 116 includes a machine-readable storage medium 106 storing software 108 that, when executed by one or more processors 102, causes the processor 102 to perform any of the steps described in this disclosure. In various embodiments, the machine readable storage medium 106 comprises volatile memory (e.g., RAM), non-volatile storage (e.g., Flash memory, hard disk drive, CD ROM, etc.), or combinations thereof. One or more of the actions described herein are performed by the processor 102 during execution of the software 108.

Figure 1C:
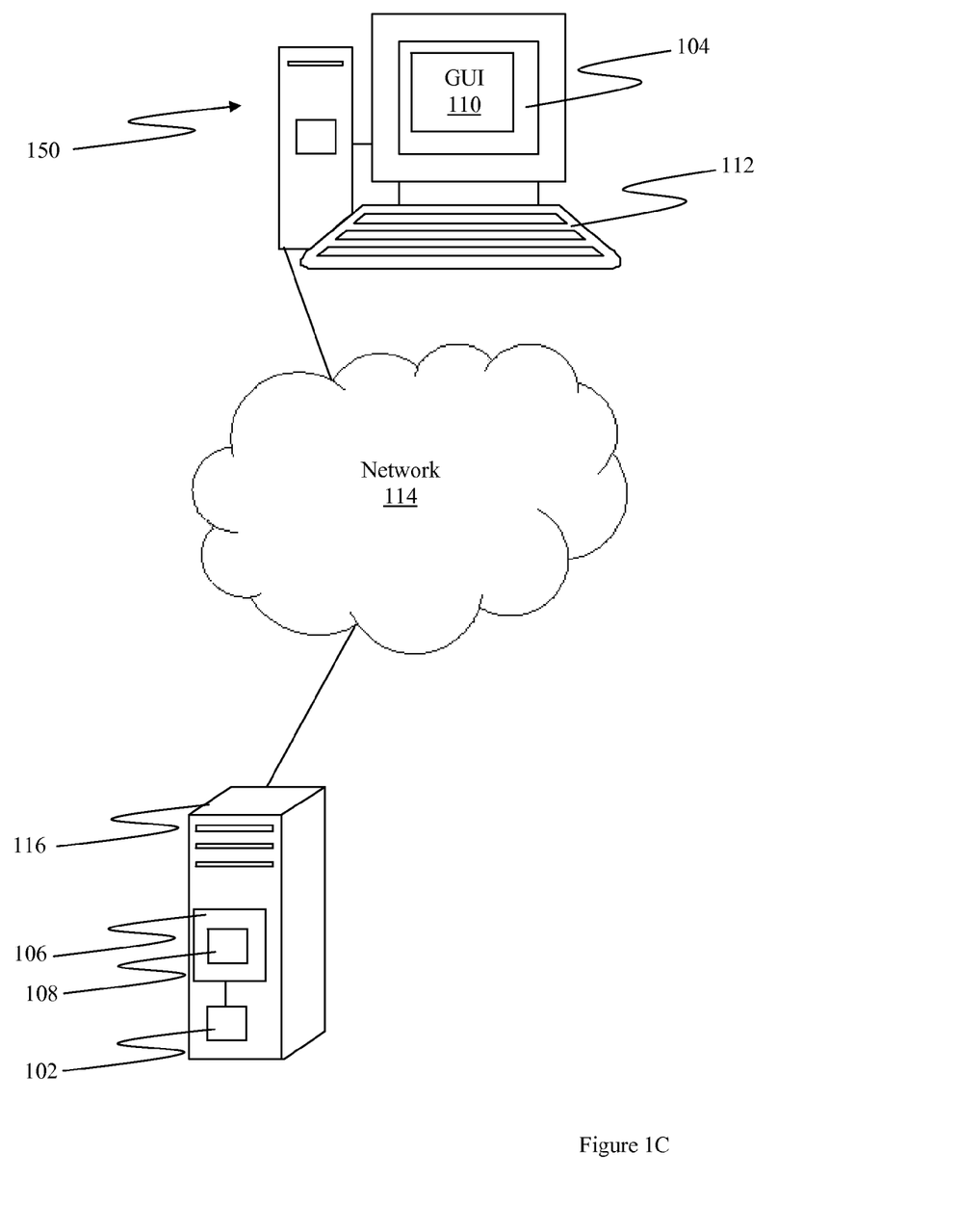
FIG. 1C illustrates a network used for processing data and displaying data in accordance with at least some illustrative embodiments.

FIG. 1C illustrates network 114 in isolation according to at least some embodiments. Specifically, the server 116 couples to a user computer 150 through networking elements. The user computer 150 includes a display 104 and an input 112. As illustrated, the display 104 is a computer monitor, and a user can manipulate a GUI 110 via the keyboard 112 and computer mouse (not shown). In such an embodiment, the processor 102 and computer-readable storage medium 106 are local. In other embodiments, components of the network 114 are distributed.

A system preferably includes a processor 102 and memory 106 coupled to the processor, illustrated as server 116. The server 116 receives a request to send first data for graphical representation in a first level of detail over a first time. Preferably, the user interacts with the GUI 110, and transmits information over the network 114 for processing by server 116. In at least some embodiments, the network 114 is the Internet. As mentioned, the data collected, summarized, and output for graphical representation can be any type of data. Preferably, the data is numeric historical data covering many variables. Such data includes counters, averages, maximums, minimums, etc.

If the level of detail requested is the level of detail of the stored data then data is presented as it was summarized. If $t_0$ to $t_n$ summarizations took place, then n samples are output to the user computer 150, which generates graphical representations based on the output. Each sample has as a sample interval equal to the summarization frequency used when the data was summarized. A mathematical discussion will be helpful. Please consider the following assumptions.

Let the sample number be n.

Let the interval for the sample $S_i = I_i[t_{end}] - I_i[t_{init}]$. The for $S_i$ is the summarization frequency used in the history window $I_i[t_{end}]$. Notice that samples would have different intervals for those times where the summarization frequency $\lambda$ changed.

With these assumptions, the equations below are used to output each $S_1$ over each requested time period.

$$S_i[CounterField] = I[ICounterField]$$

$$S_i[AverageField] = \frac{I[IAverageField]}{I[Observations]}$$

$$S_i[MaxField] = I[IMaxField]$$

$$S_i[MinField] = I[IMinField]$$

Figure 2:
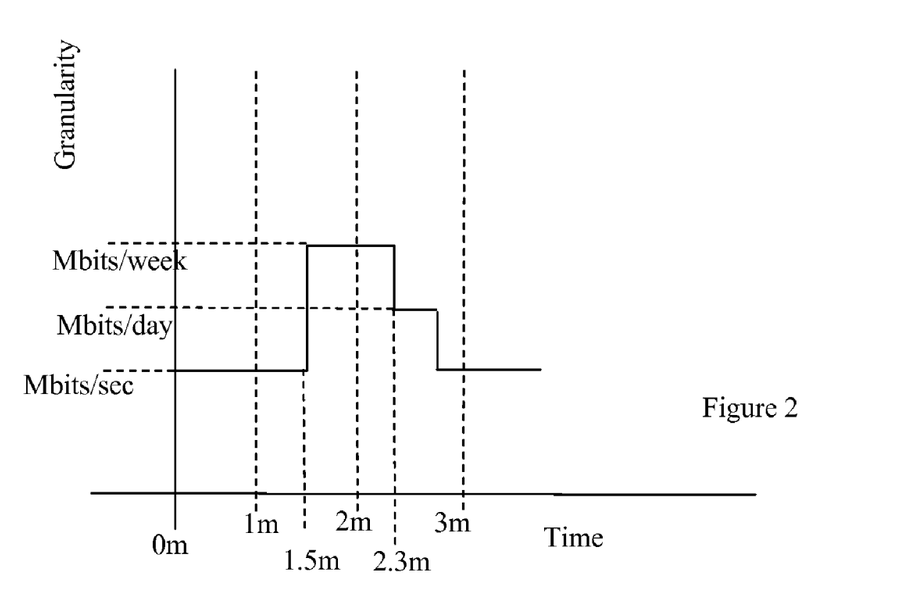
FIG. 2 illustrates adjusting a level of detail in accordance with at least some illustrative embodiments.

However, in at least some embodiments, the data stored by server 116 is summarized data stored with differing levels of detail. Preferably, the stored data is transformed into data with a single requested level of detail over any time window. FIG. 2 illustrates storage of data with different levels of detail during different times. The x-axis represents time measured in monthly increments. The y-axis represents different levels of detail of, e.g., throughput. From 0 to 1 month, the level of detail of the throughput variable is stored as megabits per second. At halfway through the time from 1 month to 2 months, the level of detail of the stored data is adjusted to megabits per week. The level of detail is adjusted twice from 2 months to 3 months: first to megabits per day, and second to megabits per second.

If the user requests throughput data over the time 1 m-3 m in megabits per month using the user computer 150, it will be unhelpful if the server 116 sends the data using the levels of detail as stored because the user would be required to perform additional calculations for meaningful comparison. As such, the server 116 preferably transforms the data stored using differing levels of detail into the single level of detail requested by the user, and the server 116 submits the requested data to user computer 150 for graphical representation.

Transforming the first stored data includes determining a plurality of sample intervals based on the time requested by the user. Continuing the example, the sample interval is one month and the number of samples is two. For clarity of discussion, intuitive time periods are used in the example; however, system appropriately responds to a request for any time period or level of detail. Transforming the data also includes determining a plurality of portions of the stored data, each portion corresponding to a different sample interval. Specifically, the portion of the stored data that corresponds to the first sample interval includes the data stored with a megabits per second level of detail after the beginning of the first month and the data stored with a megabits per week detail before the beginning of the second month. Preferably, this portion is determined by integrating the stored data from 0 m to 1.5 m, integrating the stored data from 1.5 m to 2.3 m, and normalizing the differing levels of detail while excluding portions of the first time or portions of the second not within the sample interval (0 m to 1 m, and 2 m to 2.3 m) from normalization. During integration, data is combined to generate graphical representations considering data with the same timestamp in at least one embodiment. Integration is helpful when the data to be combined is associated such that the user will want to view the information together. For example, if the user requests information about a cluster of nodes to be graphically represented as a single node.

A mathematical discussion of integration and normalization will be helpful.

Please consider the following assumptions.

Let $t_0$ be the initial time of the requested history window.
Let $t_0 \geq$ the oldest history window start.
Let $t$ be the end time of the requested history window.
Let $t \leq$ the history window end.
Let $\Gamma = \langle I_1, \ldots, I_n \rangle$ be a set of the consecutive integrations involving data for requested entities of the same type where $I_i[t_{init}] < I_{i+1}[t_{init}]$ If R is an entry (rows for databases) of one of the requested entities where $[(t_0 \leq R[t_{init}] < t) \vee (t_0 < R[t_{end}] \leq t) \vee (R[t_{init}] < t_0 \wedge_{t < R[t_{end}]})]$ then R was summarized at some $I \epsilon \Gamma$. This means that $\Gamma$ is a complete sample (there does not exist information in the data base inside the time window $[t_0, t]$ for the requested entities which is not considered at $\Gamma$).

$$I_n[t_{end}] - I_1[t_{init}] = \sum_{i=1}^{n}(I_i[t_{end}] - I_i[t_{init}])$$

Let $\Delta$ be the sample interval of the requested data (one month).

$$SamplesNumber = \frac{t - t_0}{\Delta}$$

Let $\Gamma_{S_i} = \{ I | ((t_0 + (i \cdot \Delta)) \leq I[t_{init}] < (t_0 + ((i+1) \cdot \Delta))) \vee ((t_0 + (i \cdot \Delta)) < I[t_{end}] \leq (t_0 + ((i+1) \cdot \Delta))) \vee (I[t_{init}] < (t_0 + (i \cdot \Delta)) \wedge ((i+1) \cdot \Delta) < t), I \epsilon \Gamma \}$
be the set of integrations affecting the data for the sample $S_i$ (the sample bounded by 1 m and 2 m) at $[t_0 + (i \cdot \Delta), t_0 + ((i+1) \cdot \Delta))$.

$$\text{Let } \tau^+_{S_i}(I) = \begin{cases} (t_0 + (i \cdot \Delta)) - I[t_{init}] & \text{if } (I[t_{init}] < (t_0 + (i \cdot \Delta))) \\ 0 & \text{else} \end{cases}$$

be the leftover time
by the left at the sample Si (from 0 m to 1 m).

$$\text{Let } \tau^-_{S_i}(I) = \begin{cases} I[t_{end}] - (t_0 + ((i+1) \cdot \Delta)) & \text{if } (I[t_{end}] > (t_0 + ((i+1) \cdot \Delta))) \\ 0 & \text{else} \end{cases}$$

be the leftover
time by the right at he sample Si (2 m to 2.3 m).
Considering the above assumptions, the value for the sample $S_i$ is calculated using the below equations based on the type of variable. The next sample (2 m to 3 m) can be similarly determined.

$$S_i[CounterField] = \sum_{I \in \Gamma_{S_i}} \left[ I[ICounterField] - \frac{I[ICounterField]}{I[t_{end}] - I[t_{init}]} [\tau^+_{S_i}(I) + \tau^-_{S_i}(I)] \right]$$

$$S_i[CounterField] = \sum_{I \in \Gamma_{S_i}} \left[ I[ICounterField] - I[ICounterField] \frac{[\tau^+_{S_i}(I) + \tau^-_{S_i}(I)]}{I[t_{end}] - I[t_{init}]} \right]$$

$$S_i[CounterField] = \sum_{I \in \Gamma_{S_i}} \left[ I[ICounterField] \cdot \left(1 - \frac{[\tau^+_{S_i}(I) + \tau^-_{S_i}(I)]}{I[t_{end}] - I[t_{init}]} \right) \right]$$

$$\chi_{S_i}(I) = \left(1 - \frac{[\tau^+_{S_i}(I) + \tau^-_{S_i}(I)]}{I[t_{end}] - I[t_{init}]}\right) = ReductionFactor$$

$$S_i[CounterField] = \sum_{I \in \Gamma_{S_i}} [I[ICounterField] \cdot \chi_{S_i}(I)]$$

$$S_i[AverageField] = \frac{\sum_{I \in \Gamma_{S_i}} [I[IAverageField] \cdot \chi_{S_i}(I)]}{\sum_{I \in \Gamma_{S_i}} [I[Observations] \cdot \chi_{S_i}(I)]}$$

$$S_i[MaxField] = \text{Max}\{I[IMaxField] \mid I \in \Gamma_{S_i}\}$$

$$S_i[MinField] = \text{Min}\{I[IMinField] \mid I \in \Gamma_{S_i}\}$$

In at least some embodiments, the user computer 150 requests that the processor 102 determine an accuracy of the data. As such, the accuracy of the data is output for graphical representation as well. The accuracy can be calculated using the below equation.

$$S_i[\text{Accuracy}] = \prod_{I \in \Gamma_{S_i}} I[\text{Accuracy}]$$

In at least some embodiments, the user computer 150 requests that data from different elements be grouped into entities in order to present integrated information for such entities. For example, the user may request data for several nodes together, i.e., request data about a cluster of nodes as a single entity.

As such, the server 116 receives a request to send data corresponding to a first element and a second element, but all in one level of detail over one time period. Similar to the above, the server 116 transforms data for the second element into the requested level of detail over the requested time period, but combines the data for the second element with the data for the first element.

A mathematical discussion of the combination will be helpful. Please consider the following assumptions.

Let Q be a set of entries (rows for data bases) of the same type, where $R_i[t_{init}] = R_j[t_{init}]$, $R_i$, $R_j \in Q$. If $R_i[t_{init}] = R_j[t_{init}]$ then $R_i[t_{end}] = R_j[t_{end}]$.

Considering the above assumptions, the combination is calculated using the below equations based on the type of variable.

$$ICounterField = \sum_{R \in Q} R[SCounterField]$$

$$IAverageField = \sum_{R \in Q} R[SAverageField]$$

$$IMaxField = \text{Max}\{R[SMaxField] \mid R \in Q\} \text{ or}$$

$$IMaxField = \sum_{R \in Q} R[SMaxField]$$

$$IMinField = \text{Min}\{R[SMinField] \mid R \in Q\} \text{ or}$$

$$IMinField = \sum_{R \in Q} R[SMinField]$$

Considering the accuracy of the combination, a property of independent variables is that the joint probability is product of their individual probabilities. Similarly, the accuracy of a group of elements is determined by the product of the accuracies of each individual element. Similarly, data recorded with multiple levels of detail have an accuracy proportional to the accuracies of the individual levels of detail. For example, consider a cluster of two nodes, one with a level of detail half as much as the other. If a user requests data to be presented in the level of detail of the finer node, the accuracy of the cluster is half of what it would be if the user had requested the data to be presented in the level of detail of the coarser node. The equation below is used to determine the accuracy of the combination.

$$\text{Accuracy} = \prod_{R \in Q} 1 - \frac{R[t_{unknown}]}{t_{end} - t_{init}}$$

Figure 3:
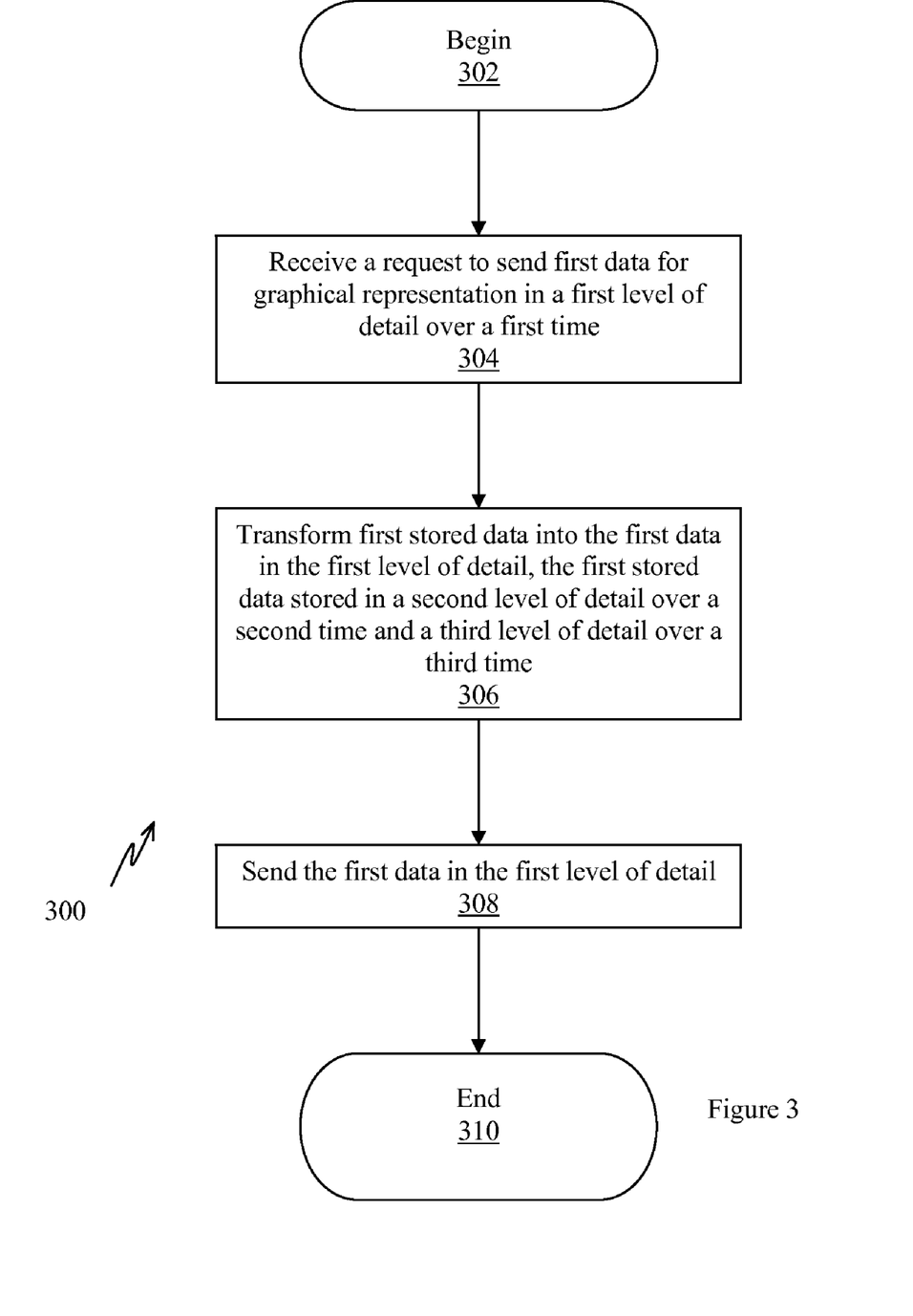
FIG. 3 illustrates a method for flexible data presentation in accordance with at least some illustrative embodiments.

FIG. 3 illustrates a method of data presentation beginning at 302 and ending at 310 in accordance with at least some embodiments. The actions can be performed in the order shown or in a different order. Furthermore, some of the actions can be performed in parallel. At 304, a request to send first data for graphical representation in a first level of detail over a first time is received. At 306, first stored data is transformed into the first data in the first level of detail. In at least some embodiments, the first stored data is stored in a second level of detail over a second time and a third level of detail over a third time. The second level of detail is not identical to the third level of detail, and the second time is not identical to the third time. Transforming the first stored data includes, in at least some embodiments, determining a plurality of sample intervals based on the first time, and determining a plurality of portions of the first stored data, each portion corresponding to a different sample interval. Determining the plurality of portions includes, in at least some embodiments, determining a portion corresponding to one sample interval by normalizing the first stored data into the first level of detail only for portions of the first time or portions of the second time within the sample interval. Normalizing the first stored data includes, in at least some embodiments, excluding portions of the first time or portions of the second time not within the sample interval from normalization. In at least some embodiments, the accuracy of the first data is determined, and sending the first data includes sending the accuracy of the first data.

At 308, the first data is sent in the first level of detail. In at least some embodiments, the first data is data for multiple elements. As such the request includes a request to send second data for graphical representation in the first level of detail over the first time, the first data associated with a first element, the second data associated with a second element. The second stored data is transformed into the second data, and sending the first data includes sending the combination of the first data and the second data. In at least some embodiments, an accuracy of the combination is determined based on an accuracy of the first data and an accuracy of the second data, and sending the first data includes sending the accuracy of the combination for graphical representation.

The above disclosure is meant to be illustrative of the principles and various embodiment of the present invention. Numerous variations and modifications will become apparent to those skilled in the art once the above disclosure is fully appreciated. Also, the order of the actions shown in FIG. 3 or described in the corresponding text can be varied from order shown, and two or more of the actions may be performed concurrently. It is intended that the following claims be interpreted to embrace all variations and modifications.

Other conditions and combinations of conditions will become apparent to those skilled in the art, including the combination of the conditions described above, and all such conditions and combinations are within the scope of the present disclosure. Additionally, audio or visual alerts may be triggered upon successful completion of any action described herein, upon unsuccessful actions described herein, and upon errors.

I claim:

1. An apparatus, comprising:
    a processor; and
    a memory coupled to the processor, the memory having stored thereon machine readable instructions to:
    receive a request for a first data at a first level of detail for a first time duration, wherein a level of detail is a measure of granularity of data;
        transform a first stored data into the first data at the first level of detail, the first stored data being stored at a second level of detail collected over a second time duration and a third level of detail collected over a third time duration, wherein the second level of detail is different from the third level of detail and the second time duration is different from the third time, and wherein the first stored data is stored in the memory; and
        send the first data at the first level of detail; and
    wherein the processor is to implement the machine readable instructions.

2. The apparatus of claim 1, wherein the machine readable instructions are further to:
    receive a request for a second data at the first level of detail over the first time duration, wherein the first data is associated with a first element and the second data is associated with a second element;
    transform a second stored data into the second data, wherein the second stored data is stored in the memory; and
    send a combination of the first data and the second data.

3. The apparatus of claim 2, wherein the machine readable instructions are further to determine an accuracy of the combination based on an accuracy of the first data and an accuracy of the second data; and
    send the accuracy of the combination of the first data and the second data with the first data.

4. The apparatus of claim 1, wherein the processor machine readable instructions are further to determine an accuracy of the first data and send the accuracy of the first data; and
    wherein the first stored data is data throughput and the second level of detail is a measure of data throughput per a measure of time and the third level of detail is a measure of data throughput per another measure of time.

5. The apparatus of claim 1, wherein to transform the first stored data, the machine readable instructions are further to:
    determine a plurality of sample intervals based on the first time; and
    determine a plurality of portions of the first stored data, wherein the plurality of sample intervals and the plurality of portions are in a one-to-one correspondence.

6. The apparatus of claim 5, wherein to determine the plurality of portions, the machine readable instructions are further to determine a portion corresponding to one sample interval by normalizing the first stored data at the first level of detail only for portions of the first time duration within the one sample interval or portions of the second time duration within the one sample interval.

7. The apparatus of claim 6, wherein to normalize the first stored data is to exclude portions of the first time duration not within the sample interval or portions of the second time duration not within the sample interval from normalization.

8. A method, comprising:
    receiving, by a processor, a request for a first data at a first level of detail for a first time duration, wherein a level of detail is a measure of granularity of data;
    transforming a first stored data into the first data at the first level of detail, the first stored data being stored at a second level of detail collected over a second time duration and a third level of detail collected over a third time duration, wherein the second level of detail is different from the third level of detail and the second time duration is different from the third time duration; and
    sending the first data at the first level of detail.

9. The method of claim 8, further comprising:
    receiving a request for a second data at the first level of detail over the first time duration, wherein the first data is associated with a first element and the second data is associated with a second element;
    transforming a second stored data into the second data; and
    wherein sending the first data comprises sending a combination of the first data and the second data.

10. The method of claim 9, further comprising:
    determining an accuracy of the combination based on an accuracy of the first data and an accuracy of the second data; and
    wherein sending the first data comprises sending the accuracy of the combination of the first data and the second data.

11. The method of claim 8, further comprising:
    determining an accuracy of the first data;
    wherein sending the first data comprises sending the accuracy of the first data; and
    wherein the first stored data is data throughput, the second level of detail is a measure of data throughput per a measure of time, and the third level of detail is a measure of data throughput per another measure of time.

12. The method of claim 8, wherein transforming the first stored data further comprises:
    determining a plurality of sample intervals based on the first time duration; and
    determining a plurality of portions of the first stored data, the plurality of sample intervals and the plurality of portions being in a one-to-one correspondence.

13. The method of claim 12, wherein determining the plurality of portions comprises determining a portion corresponding to one sample interval by normalizing the first stored data at the first level of detail only for portions of the first time duration within the one sample interval or portions of the second time duration within the one sample interval.

14. The method of claim 13, further comprising normalizing the first stored data comprising excluding portions of the first time duration not within the sample interval or portions of the second time duration not within the sample interval from normalization.

15. A non-transitory machine-readable storage medium comprising computer-executable instructions that, when executed by a processor, cause the processor to:
    receive a request to send a first data at a first level of detail over a first time duration, wherein a level of detail is a measure of granularity of data;
    transform a first stored data into the first data at the first level of detail, wherein the first stored data is stored at a second level of detail collected over a second time duration and a third level of detail collected over a third time duration, wherein the second level of detail is different from the third level of detail and the second time duration is different from the third time duration; and
    send the first data at the first level of detail.

16. The non-transitory machine-readable storage medium of claim 15, wherein the instructions further cause the processor to:
- receive a request for a second data at the first level of detail over the first time duration, wherein the first data is associated with a first element and the second data is associated with a second element;
- transform a second stored data into the second data; and
- send the first data comprising a combination of the first data and the second data.

17. The non-transitory machine-readable storage medium of claim 16, wherein the instructions further cause the processor to:
- determine an accuracy of the combination based on an accuracy of the first data and an accuracy of the second data;
- send the first data to include the accuracy of the combination; and
- wherein the first stored data is data throughput and the second level of detail is a measure of data throughput per a measure of time and the third level of detail is a measure of data throughput per another measure of time.

18. The non-transitory machine-readable storage medium of claim 15, wherein the instructions to transform the first stored data cause the processor to:
- determine a plurality of sample intervals based on the first time duration; and
- determine a plurality of portions of the first stored data, the plurality of sample intervals and the plurality of portions in a one-to-one correspondence.

19. The non-transitory machine-readable storage medium of claim 18, wherein the instructions to determine the plurality of portions cause the processor to determine a portion corresponding to one sample interval by normalizing the first stored data into the first level of detail only for portions of the first time duration within the one sample interval or portions of the second time duration within the one sample interval.

20. The non-transitory machine-readable storage medium of claim 19, wherein the instructions to normalize the first stored data cause the processor to exclude portions of the first time duration not within the sample interval or portions of the second time duration not within the sample interval from normalization.

* * * * *

UNITED STATES PATENT AND TRADEMARK OFFICE
CERTIFICATE OF CORRECTION

PATENT NO. : 8,390,625 B2
APPLICATION NO. : 12/608830
DATED : March 5, 2013
INVENTOR(S) : Fabiel Zuniga Page 1 of 1

It is certified that error appears in the above-identified patent and that said Letters Patent is hereby corrected as shown below:

On the title page, in item (54), and in the specification, column 1, line 1, Title, delete "TRANFORMING" and insert -- TRANSFORMING --, therefor.

In the Claims

In column 9, line 37, in Claim 3, delete "the" and insert -- the processor --, therefor.

Signed and Sealed this
Twenty-fifth Day of June, 2013

Teresa Stanek Rea
*Acting Director of the United States Patent and Trademark Office*